(12) United States Patent
Koide et al.

(10) Patent No.: US 10,528,196 B2
(45) Date of Patent: Jan. 7, 2020

(54) ELECTRONIC DEVICE

(71) Applicant: Japan Display Inc., Tokyo (JP)

(72) Inventors: Gen Koide, Tokyo (JP); Tadayoshi Katsuta, Tokyo (JP); Toshiaki Fukushima, Tokyo (JP); Naoyuki Obinata, Tokyo (JP)

(73) Assignee: Japan Display Inc., Tokyo (JP)

( * ) Notice: Subject to any disclaimer, the term of this patent is extended or adjusted under 35 U.S.C. 154(b) by 392 days.

(21) Appl. No.: 15/409,867

(22) Filed: Jan. 19, 2017

(65) Prior Publication Data

US 2017/0220153 A1 Aug. 3, 2017

(30) Foreign Application Priority Data

Jan. 28, 2016 (JP) ................................. 2016-014220

(51) Int. Cl.
*G06F 3/044* (2006.01)
*G06F 3/041* (2006.01)
*G09G 3/36* (2006.01)

(52) U.S. Cl.
CPC ............ *G06F 3/044* (2013.01); *G06F 3/0412* (2013.01); *G06F 3/0416* (2013.01); *G09G 3/36* (2013.01)

(58) Field of Classification Search
CPC ...... G06F 3/044; G06F 3/0412; G06F 3/0416; G06F 3/041; G06F 2203/04103; G09G 3/36; G02F 1/13338; G02F 1/133308; G02F 1/133512; G02F 1/133514; G02F 1/13394; G02F 1/13439; G02F 1/13454; G02F 1/136286; G02F 2001/133311; G02F 2201/123
See application file for complete search history.

(56) References Cited

U.S. PATENT DOCUMENTS 9,367,165 B2 6/2016 Araki et al.
2012/0044195 A1* 2/2012 Nakanishi ............. G06F 3/0412
345/174

(Continued)

FOREIGN PATENT DOCUMENTS

JP 2015-075605 A 4/2015

*Primary Examiner* — Lunyi Lao
*Assistant Examiner* — Jarurat Suteerawongsa
(74) *Attorney, Agent, or Firm* — Michael Best & Friedrich LLP

(57) ABSTRACT

A display apparatus which can reduce a parasitic capacitance during driving of driving electrodes based on a self-capacitance detecting method is provided. The display apparatus includes: a plurality of connection wires which are formed in a peripheral area and are connected to a plurality of corresponding video signal lines; a video signal line selection circuit which is connected with a plurality of connection wires, selects at least one connection wire and supplies a signal to the video signal lines; self-capacitance detection wires which extend in a direction intersecting an extension direction of the connection wires and intersects the connection wires; common wires which electrically connect the self-capacitance detection wires and drive electrodes; and transistors which are provided between the self-capacitance detection wires and the common wires. Further, the self-capacitance detection wires extend between a display area and the video signal line selection circuit in a plan view.

18 Claims, 13 Drawing Sheets

(56) References Cited

U.S. PATENT DOCUMENTS

2014/0132534 A1* 5/2014 Kim ................. G06F 3/0412
                                                    345/173
2015/0309634 A1* 10/2015 Lee ................. G06F 3/0412
                                                    345/173

* cited by examiner

ELECTRONIC DEVICE

CROSS-REFERENCE TO RELATED APPLICATION

The present application claims priority from Japanese Patent Application No. 2016-014220 filed on Jan. 28, 2016, the content of which is hereby incorporated by reference into this application.

TECHNICAL FIELD OF THE INVENTION

The present invention relates to a display apparatus. For example, the present invention relates to a display apparatus with a touch detection function capable of detecting approach or contact of an object based on change of an electrostatic capacity.

BACKGROUND OF THE INVENTION

In recent years, a touch detection device which is so called touch panel capable of detecting approach or contact of an object has attracted attention. The touch panel is used in a display apparatus with a touch detection function mounted on or integrated with a display apparatus such as a liquid crystal display apparatus. In the display apparatus with the touch detection function, information can be input using a touch panel replaced with a normal mechanical button by causing the display apparatus to display a button image or others. A display apparatus with a touch detection function having such a touch panel does not require an input device such as a keyboard, a mouse, and a keypad, and therefore, usage of the display apparatus tends to expand to not only a computer but also a mobile information terminal such as a mobile phone.

As types of touch detection devices, some types such as an optical type, a resistance type, and a capacitive type are cited. Among these types, a touch detection device of the capacitive type has a relatively simple structure and can achieve lower power consumption, and therefore, is used for the mobile information terminal or others. For example, Japanese Patent Application Laid-open Publication No. 2015-075605 (Patent Document 1) describes a display apparatus with a touch detection function having a capacitive touch panel.

SUMMARY OF THE INVENTION

As a capacitive detecting method of the above-described display apparatus with a touch detection function, a so-called self-capacitance detecting method which is a method for detection using change in a ground capacitance of a detection electrode due to approach or contact of an object is cited. In this self-capacitance detecting method, a drive electrode (also referred to as a common electrode) also has a function of a detection electrode which detects the approach or the contact of the object.

For example, when a plurality of drive electrodes are arranged so as to extend in a longitudinal direction of a panel and so as to be next to one another in a lateral direction, a selection circuit which selects video signal lines, self-capacitance detection wires, and a driver chip which supplies signals to the video signal lines are arranged in this order in a longitudinal-direction lower area of a peripheral area of a display area.

In such arrangement, while the self-capacitance detection wires are formed so as to extend along the lateral direction, connection wires which supply signals to the video signal lines are formed so as to extend along the longitudinal direction. Therefore, the self-capacitance detection wires and the connection wires which supply signals to the video signal lines intersect each other, and therefore, a parasitic capacitance produced by the intersection becomes a load during driving of the driving electrode based on the self-capacitance detecting method. Particularly, the self-capacitance detecting method has a larger influence of the load of the parasitic capacitance on the detection than that of a mutual capacitance detecting method.

An object of the present invention is to provide a display apparatus which can reduce a parasitic capacitance during driving of a drive electrode based on a self-capacitance detection method.

A display apparatus according to one aspect of the present invention includes: a first electrode; a second electrode facing the first electrode; and a plurality of signal lines, which are in a display area. Further, the display apparatus includes: a plurality of connection wires which are in a peripheral area and which are connected to the plurality of corresponding signal lines; a selection circuit which is connected with the plurality of connection wires, which selects at least one connection wire of the plurality of connection wires and which supplies a signal to one signal line of the signal lines via the connection wire; a first wire which extends in a direction intersecting an extension direction of the connection wires and which intersects the connection wires; a second wire which electrically connects the first wire and the second electrode; and a switching element which is between the first wire and the second wire. Furthermore, the first wire extends between the display area and the selection circuit in a plan view.

BRIEF DESCRIPTIONS OF THE DRAWINGS

Figure 12:
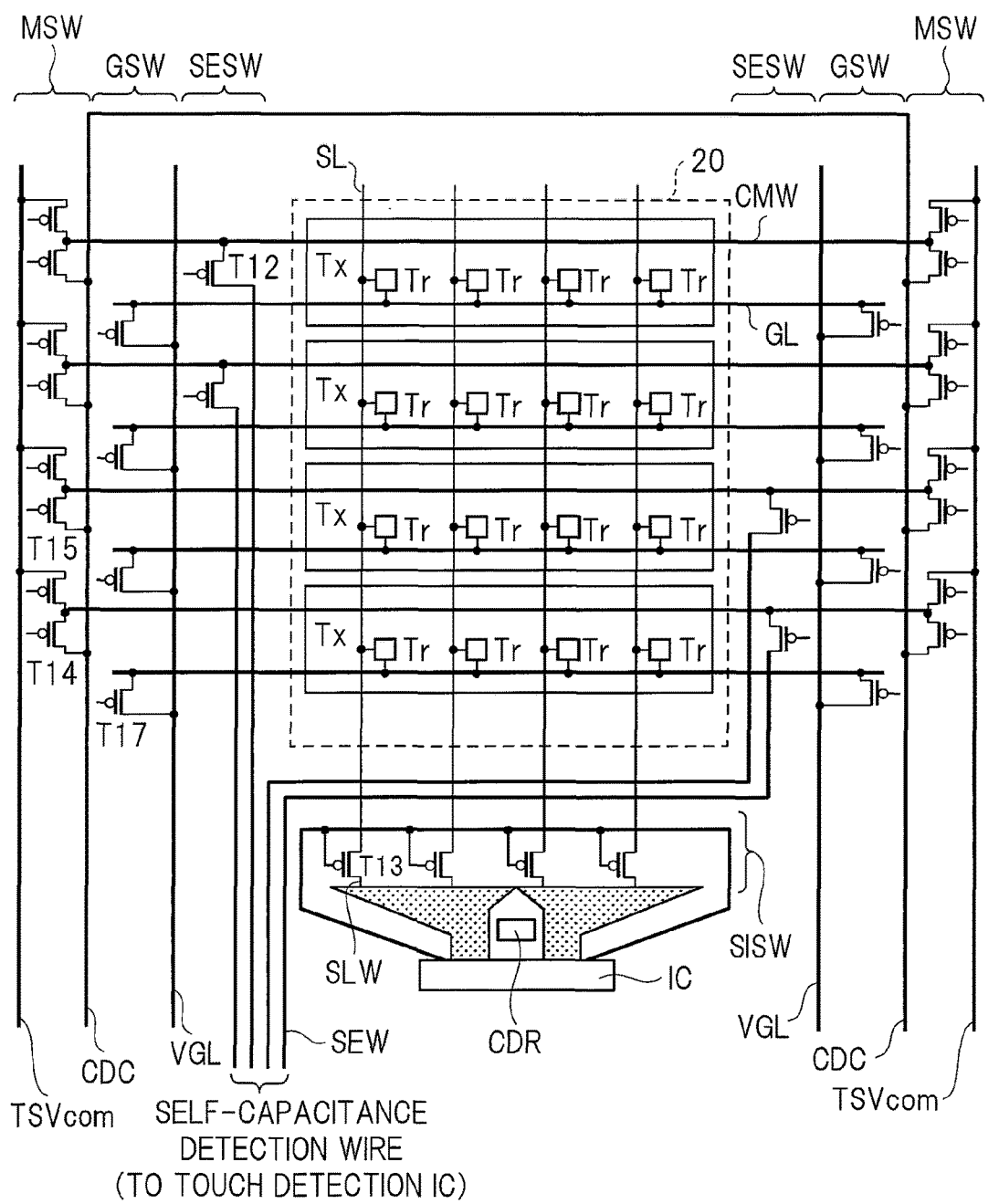
Figure 13:
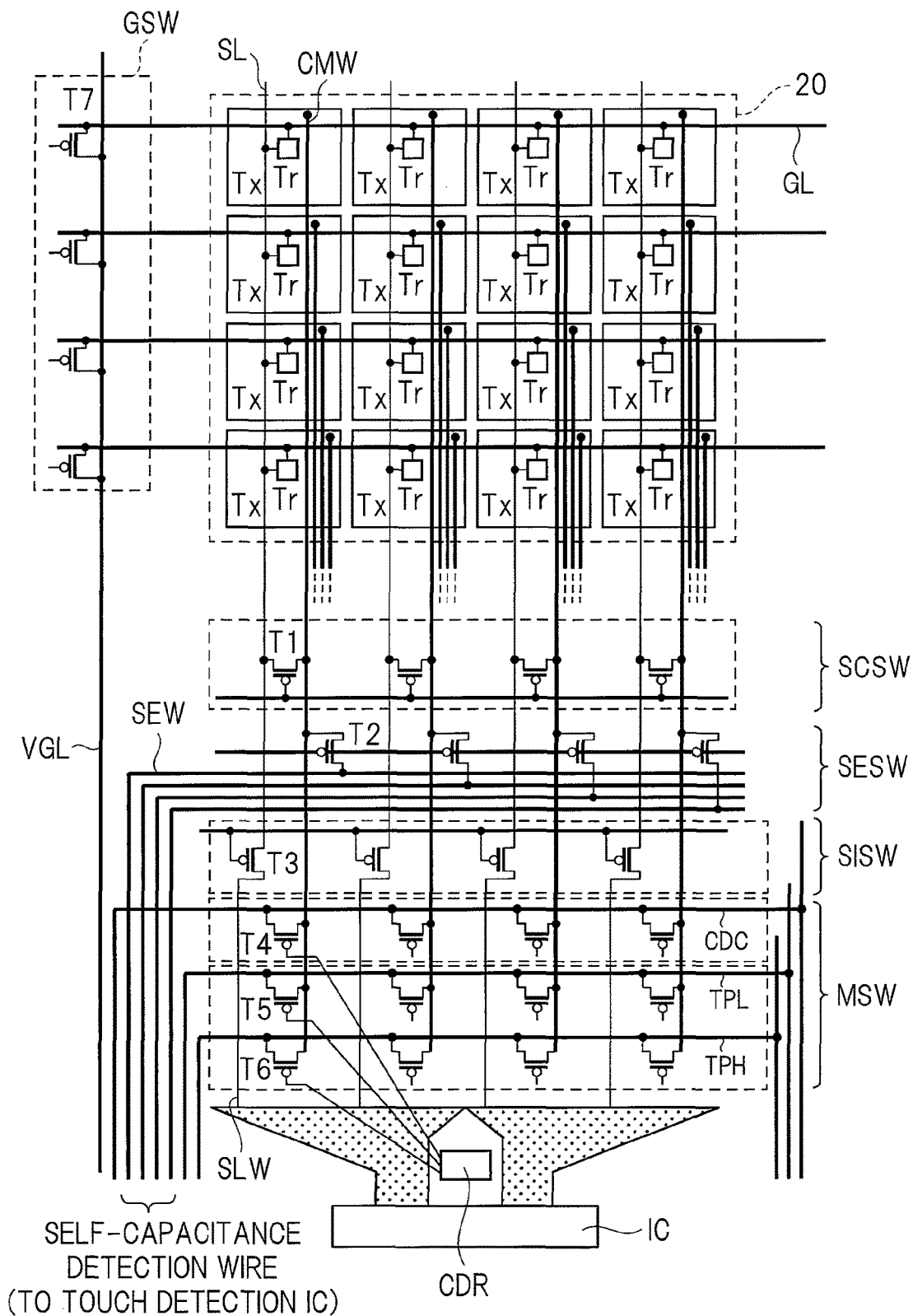

FIG. 12 is a circuit diagram illustrating an example of a main configuration including self-capacitance detection wires according to a first modified example in the display apparatus with the touch detection function according to the embodiment; and FIG. 13 is a circuit diagram illustrating an example of a main configuration including self-capacitance detection wires according to a second modified example in the display apparatus with the touch detection function according to the embodiment.

DESCRIPTIONS OF THE PREFERRED EMBODIMENTS

The following is explanation for each embodiment of the present invention with reference to drawings. Note that disclosure is merely one example, and appropriate change with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not limit the interpretation of the present invention.

In the present specification and each drawing, similar elements to those described earlier for the already-described drawings are denoted by the same reference characters, and detailed description for them is appropriately omitted in some cases. Further, in the drawings used in the embodiments, hatching added for distinguishing structures is omitted in accordance with the drawings in some cases.

Embodiment

A technique described in the following embodiments is widely applicable to a display apparatus including a mechanism which supplies signals from a peripheral area of a display area to a plurality of elements in the display area provided with an optical element layer. As the display apparatus as described above, various display apparatuses containing, for example, liquid crystal, an organic light emitting diode (OLED), a micro electro mechanical system (MEMS) shutter, and others as optical element layers can be exemplified.

A liquid crystal display apparatus will be described while exemplifying a display apparatus in the following embodiments. However, as other application examples, various flat panel display apparatuses such as an organic EL display apparatus and other self-luminous type display apparatus can be cited.

The following is explanation about an example of application of a liquid crystal display apparatus to a display apparatus with a touch detection function as the embodiment. Here, the display apparatus with the touch detection function refers to a liquid crystal display apparatus in which a detection electrode for touch detection is provided to either a pixel substrate (also referred to as a transistor substrate or others) and a facing substrate (also referred to as a color filter substrate or others) included in the display apparatus. Further, in the embodiment, an in-cell type display apparatus with a touch detection function will be described, the in-cell type display apparatus having a feature which provides a driving electrode so as to operate as a driving electrode of a touch panel. Although the touch detecting function, the touch panel, and others will be appropriately described below, note that they may be a detecting function and a panel which detect an approach of an object.

<Display Apparatus with Touch Detection Function>

Figure 1:
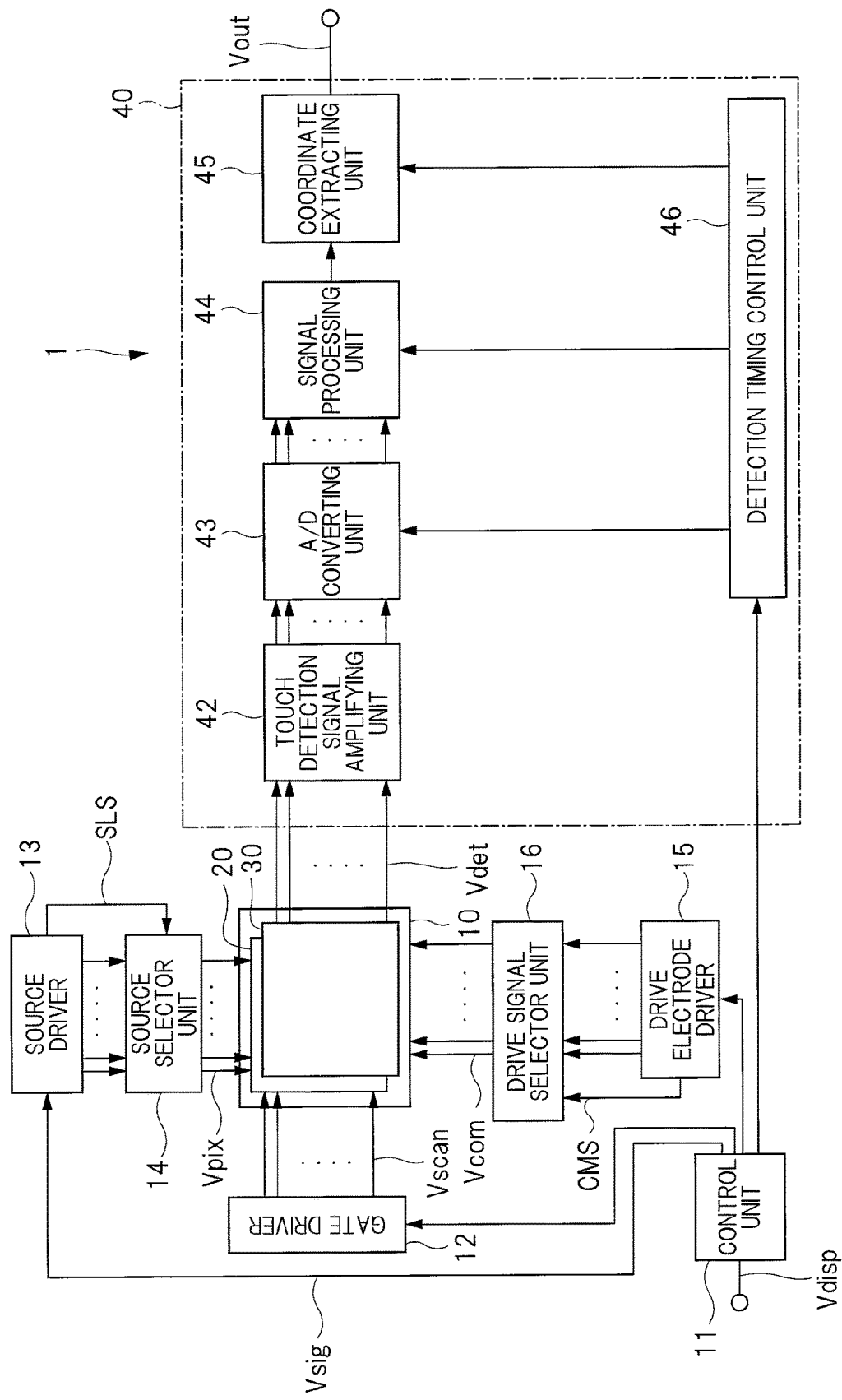
FIG. 1 is a block diagram illustrating an example of a schematic configuration of a display apparatus with a touch detection function according to an embodiment.

First, a configuration of the display apparatus with the touch detection function according to the present embodiment will be described with reference to FIG. 1. FIG. 1 is a block diagram illustrating an example of a schematic configuration of the display apparatus with the touch detection function according to the present embodiment.

The display apparatus with the touch detection function 1 includes a display device with a touch detection function 10, a control unit 11, a gate driver 12, a source driver 13, a source selector unit 14, a drive electrode driver 15, a drive signal selector unit 16 and a touch detecting unit 40. This display apparatus with the touch detection function 1 is a display apparatus in which the display device with the touch detection function 10 has a touch detection function therein.

The display apparatus with the touch detection function 10 is a so-called in-cell type device formed by integrating a liquid crystal display device 20 using liquid crystal display elements as display elements and a capacitive touch detection device 30. Note that the display apparatus with the touch detection function 10 may be a so-called on-cell type device formed by attaching the capacitive touch detection device 30 on the liquid crystal display device 20 using the liquid crystal display elements as the display elements.

The liquid crystal display device 20 is a device which sequentially scans each horizontal line in accordance with a scan signal Vscan supplied from the gate driver 12 to display images.

The control unit 11 is a circuit which supplies control signals to the gate driver 12, the source driver 13, the drive electrode driver 15 and the touch detecting unit 40 based on a video signal Vdisp supplied from an outside so that these units operate in synchronization with one another.

The gate driver 12 has a function of sequentially selecting one horizontal line which is a display drive target in the display apparatus with the touch detection function 10, based on the control signal supplied from the control unit 11.

The source driver 13 is a circuit which supplies a pixel signal Vpix to each pixel Pix (subpixel SPix) described below (FIG. 4) in the display apparatus with the touch detection function 10, based on the control signal supplied from the control unit 11. The source driver 13 generates a pixel signal obtained by performing time division multiplexing on the pixel signals Vpix of a plurality of subpixels SPix of the liquid crystal display device 20, from a video signal of one horizontal line, and supplies the pixel signals to the source selector unit 14.

Figure 3:
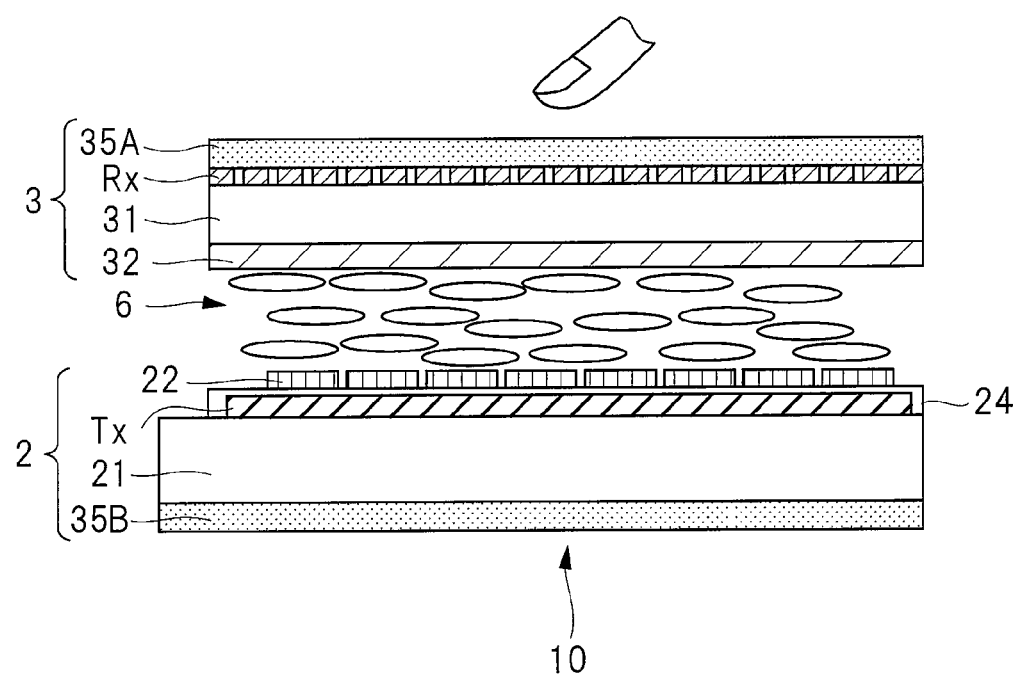
FIG. 3 is a cross-sectional view illustrating an example of a schematic cross-sectional structure of the display apparatus with the touch detection function according to the embodiment.

Further, the source driver 13 generates a switch control signal SLS required for demultiplexing the pixel signals Vpix multiplexed on an image signal Vsig, and supplies the switch control signal SLS together with the pixel signals Vpix to the source selector unit 14. The source selector unit 14 performs multiplexer driving for supplying the pixel signals Vpix so as to sequentially perform writing on each subpixel SPix corresponding to each color of a color filter 32 described below (FIG. 3).

The drive electrode driver 15 is a circuit which supplies a drive signal Vcom to a drive electrode Tx described below (FIG. 2) in the display apparatus with the touch detection function 10, based on the control signal supplied from the control unit 11. The drive signal selector unit 16 selects the drive electrode Tx to which the drive signal Vcom is supplied, in accordance with a switch control signal CMS generated by the drive electrode driver 15.

The touch detection device 30 is a device which operates based on a principal of a capacitive touch detection, and outputs a touch detection signal Vdet. The capacitive touch detection includes a mutual capacitive detecting method described below (FIG. 5), and a self-capacitance detecting method described below (FIG. 6).

The touch detection device 30 performs the touch detection by supplying the drive signal Vcom from the drive electrode driver 15 via the drive signal selector unit 16 to the drive electrode Tx as the drive signal Vcom for touch detection (also referred to as the touch drive signal Vcom below), and sequentially scanning detection blocks one by one in accordance with the touch drive signal Vcom.

To the touch detecting unit 40, the touch detection device 30 outputs and supplies the touch detection signal Vdet for each detection block from a plurality of touch detection electrodes Rx described below (FIGS. 5 and 6).

The touch detecting unit 40 is a circuit which detects whether or not the touch detection device 30 is touched (approached or contacted) based on the control signal supplied from the control unit 11 and the touch detection signal Vdet supplied from the touch detection device 30 of the display apparatus with the touch detection function 10 and which obtains coordinates of the touching or others in a touch detection area when it is touched. This touch detecting unit 40 includes a touch detection signal amplifying unit 42, an analog to digital (A/D) converting unit 43, a signal processing unit 44, a coordinate extracting unit 45, and a detection timing control unit 46.

The touch detection signal amplifying unit 42 amplifies the touch detection signal Vdet supplied from the touch detection device 30. Note that the touch detection signal amplifying unit 42 may include a lowpass analog filter which removes a high frequency component (noise component) contained in the touch detection signal Vdet and which extracts and outputs a touch component.

The A/D converting unit 43 is a circuit which samples an analog signal output from the touch detection signal amplifying unit 42 at a timing in synchronization with the drive signal Vcom and which converts the analog signal into a digital signal.

The signal processing unit 44 includes a digital filter which removes a higher frequency component (noise component) being contained in an output signal of the A/D converting unit 43 and being higher than a frequency at which the touch drive signal Vcom has been sampled and which extracts the touch component. The signal processing unit 44 is a logic circuit which detects whether or not the touch detection device 30 has been touched, based on the output signal of the A/D converting unit 43.

The coordinate extracting unit 45 is a logic circuit which acquires touch panel coordinates of the touch when the signal processing unit 44 detects the touch. The detection timing control unit 46 performs control so that the A/D converting unit 43, the signal processing unit 44 and the coordinate extracting unit 45 operate in synchronization with one another. The coordinate extracting unit 45 outputs the touch panel coordinates as a signal output Vout.

<Module>

Figure 2:
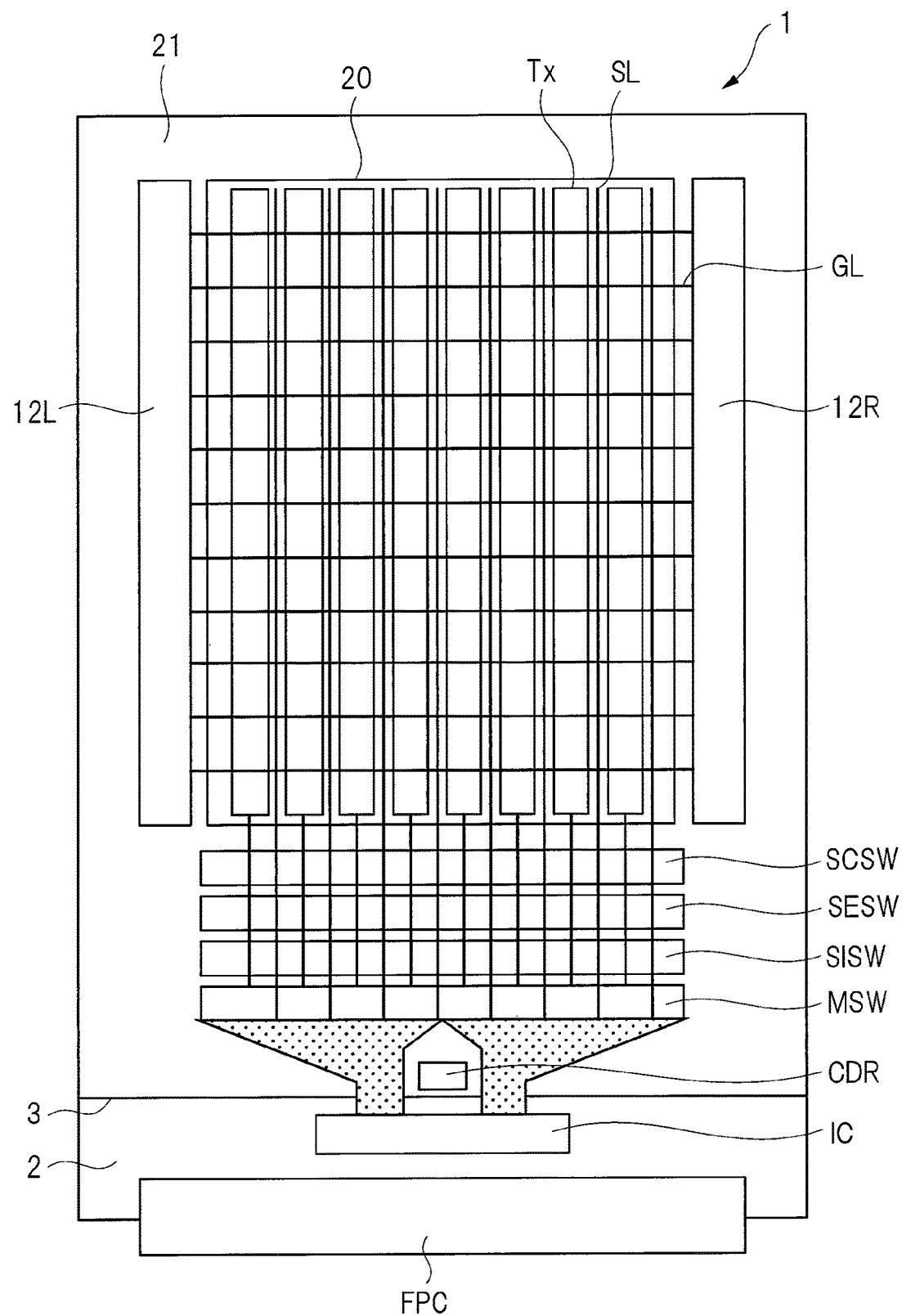
FIG. 2 is a diagram illustrating an example of a module on which the display apparatus with the touch detection function according to the embodiment is mounted.

FIG. 2 is a diagram illustrating an example of a module on which a display apparatus with a touch detection function according to the present embodiment is mounted.

As illustrated in FIG. 2, the display apparatus with the touch detection function 1 includes: the liquid crystal display device 20; gate drivers 12L and 12R; a signal-line/common-wire short-circuiting switch circuit SCSW; a self-capacitance detection switch circuit SESW; a video signal line selection circuit SISW; a mutual capacitance detection switch circuit MSW; a drive electrode drive circuit CDR; and a driver chip IC. The video signal line selection circuit SISW is included in the source selector unit 14 illustrated in FIG. 1. The signal-line/common-wire short-circuiting switch circuit SCSW, the self-capacitance detection switch circuit SESW and the mutual capacitance detection switch circuit MSW are included in the drive signal selector unit 16 illustrated in FIG. 1. The drive electrode drive circuit CDR is included in the drive electrode driver 15 illustrated in FIG. 1. The driver chip IC includes the control unit 11 and the source driver 13 illustrated in FIG. 1 and others.

The gate drivers 12L and 12R, the signal-line/common-wire short-circuiting switch circuit SCSW, the self-capacitance detection switch circuit SESW, the video signal line selection circuit SISW, the mutual capacitance detection switch circuit MSW and the drive electrode drive circuit CDR are formed on a TFT substrate 21 which is a glass substrate. The gate drivers 12L and 12R are formed on left and right (along a long side of the TFT substrate 21) across the liquid crystal display device 20 in a plan view. The gate driver 12L is formed on the left, and the gate driver 12R is formed on the right. The signal-line/common-wire short-circuiting switch circuit SCSW, the self-capacitance detection switch circuit SESW, the video signal line selection circuit SISW, the mutual capacitance detection switch circuit MSW and the drive electrode drive circuit CDR are formed on a lower side of the liquid crystal display device 20 (along a short side of the TFT substrate 21) in a plan view. On the lower side of the liquid crystal display device 20, the signal-line/common-wire short-circuiting switch circuit SCSW, the self-capacitance detection switch circuit SESW, the video signal line selection circuit SISW, the mutual capacitance detection switch circuit MSW and the drive electrode drive circuit CDR are arranged in this order.

The driver chip IC is an integrated circuit (IC) chip mounted on the TFT substrate 21, and has circuits such as the control unit 11 and the source driver 13 illustrated in FIG. 1 which are necessary for a display operation therein. The driver chip IC is mounted below the drive electrode drive circuit CDR in a plan view. A portion of the TFT substrate 21 on which the driver chip IC is mounted will be also referred to as a panel. In the display apparatus with the touch detection function 1, note that circuits such as the gate driver 12 may be embedded in the driver chip IC.

In the TFT substrate 21, the video signal line selection circuit SISW is formed so as to be connected between the video signal line SL of the liquid crystal display device 20 and the driver chip IC. The self-capacitance detection switch circuit SESW and the mutual capacitance detection switch circuit MSW are formed so as to be connected with the drive electrode Tx. The signal-line/common-wire short-circuiting switch circuit SCSW is formed so as to be connected between the video signal line SL and the drive electrode Tx.

In the liquid crystal display device 20 of the display apparatus with the touch detection function 1, the drive electrodes Tx and the scan signal lines GL sterically intersecting the drive electrodes Tx are schematically illustrated in a vertical direction (plan view) with respect to a surface of the TFT substrate 21. Further, in the liquid crystal display device 20, the drive electrodes Tx and the video signal lines SL not intersecting but extending in a parallel to the drive electrodes Tx are schematically illustrated in the vertical direction with respect to the surface of the TFT substrate 21.

The drive electrodes Tx are formed so as to extend in a long-side direction (longitudinal direction) of the liquid crystal display device 20 and so as to be next to one another in a short-side direction (lateral direction) of the same, and touch detection electrodes Rx described below (FIGS. 5 and 6) are formed so as to extend in a short-side direction of the display apparatus with the touch detection function 10 and so as to be next to one another in a long-side direction of the same. An output of the touch detection electrode Rx is provided closer to be the short side of the liquid crystal display device 20, and is connected with the touch detecting unit 40 (see FIG. 1) mounted outside this module via a terminal unit configured by a flexible printed circuit board FPC or others.

Figure 11:
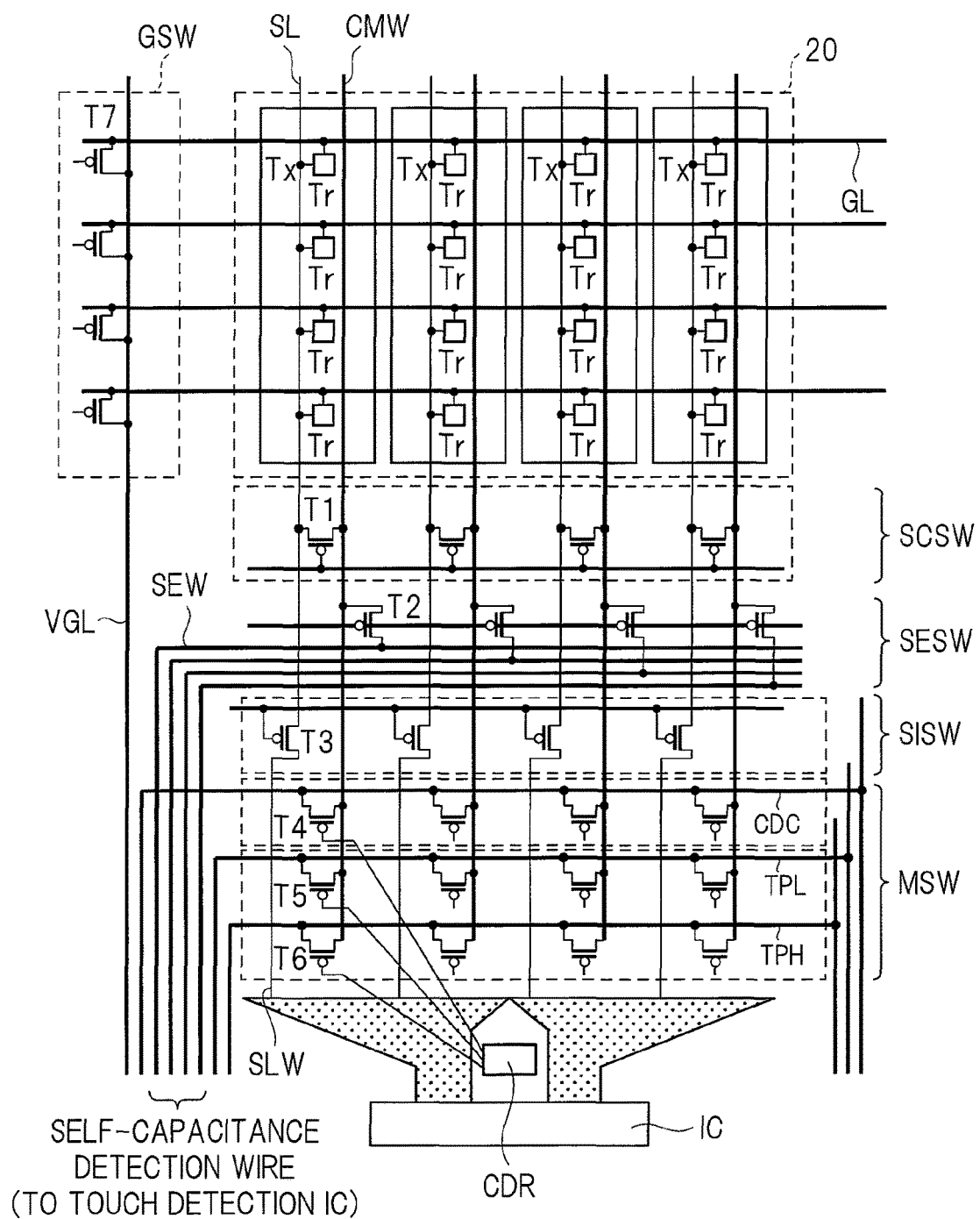
FIG. 11 is a circuit diagram illustrating an example of a main configuration including the self-capacitance detection wires according to the embodiment.

On the flexible printed circuit board FPC, Voltage supply lines which supply power to the gate drivers 12L and 12R, the self-capacitance detection switch circuit SESW, the mutual-capacitance detection switch circuit MSW, and others formed on the TFT substrate 21 are formed. The voltage supply lines include voltage supply lines which supply voltages such as a voltage VGL, a voltage CDC, a voltage TPL and a voltage TPH although described in detail below (FIG. 11 and others).

<Display Apparatus with Touch Detection Function>

Figure 4:
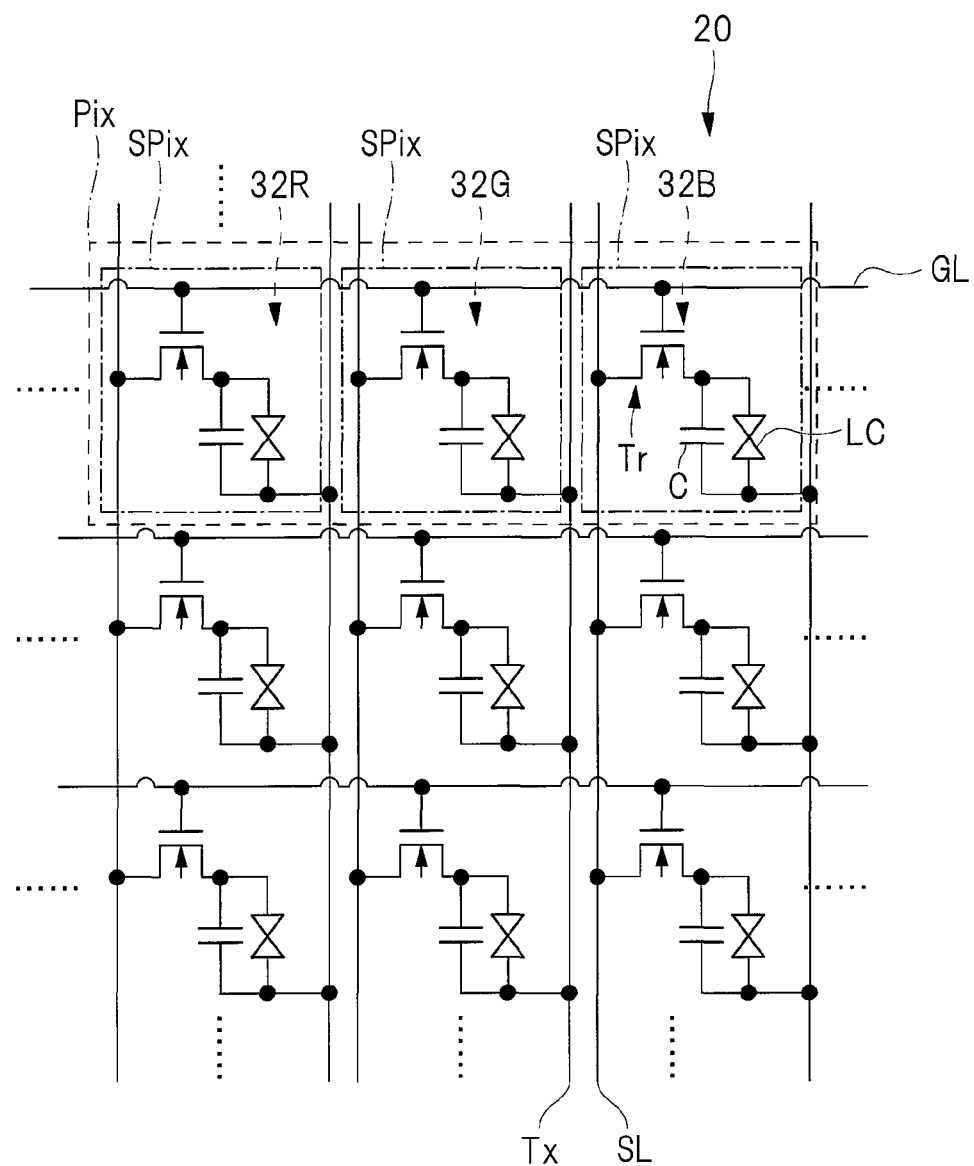
FIG. 4 is a circuit diagram illustrating an example of pixel array of a liquid crystal display apparatus according to the embodiment.

Next, a configuration example of the above-described display apparatus with the touch detection function 10 will be described in detail. FIG. 3 is a cross-sectional view illustrating an example of a schematic cross-sectional structure of the display apparatus with the touch detection function 10 according to the present embodiment. FIG. 4 is a circuit diagram illustrating an example of pixel array of the liquid crystal display device 20 according to the present embodiment.

As illustrated in FIG. 3, the display apparatus with the touch detection function 10 includes a pixel substrate 2, a facing substrate 3 which is arranged to face a surface of this pixel substrate 2 in the vertical direction, and a liquid crystal layer 6 which is an optical element layer inserted between the pixel substrate 2 and the facing substrate 3.

The liquid crystal layer 6 is configured to include a plurality of liquid crystal molecules, and modulates light passing the liquid crystal layer in accordance with an electric field state. Note that oriented films may be arranged between the liquid crystal layer 6 and the pixel substrate 2 and between the liquid crystal layer 6 and the facing substrate 3 illustrated in FIG. 3, respectively.

The facing substrate 3 includes a glass substrate 31 and the color filter 32 which is formed on one surface of this glass substrate 31 (closer to the liquid crystal layer 6). The touch detection electrodes Rx which are detection electrodes of the touch detection device 30 are formed on the other surface of the glass substrate 31, and a polarizing plate 35A is arranged on these touch detection electrodes Rx.

The pixel substrate 2 includes the TFT substrate 21 which is a circuit substrate, a plurality of pixel electrodes 22 which is arranged in a matrix pattern on this TFT substrate 21 (closer to the liquid crystal layer 6), a plurality of drive electrodes Tx which are formed between the TFT substrate 21 and the pixel electrodes 22, an insulation layer 24 which insulates the pixel electrodes 22 and the drive electrodes Tx from each other, and an incidence-side polarizing plate 35B which is arranged closer to a lower surface of the TFT substrate 21.

The present embodiment adopts a fringe field switching (FFS) mode which produces a fringe electric field between the pixel electrodes 22 and the drive electrodes Tx to rotate the liquid crystal modules. However, it also can adopt a horizontal electric field mode such as an in-plane switching (IPS) mode. Note that it also may adapt a twisted nematic (TN) mode, a vertical alignment (VA) mode, or others as the vertical electric field mode.

The pixel electrodes 22 and the drive electrodes Tx are formed by using a transmissive conductive film made of indium tin oxide (ITO) or others.

On the TFT substrate 21, a thin film transistor (TFT) element Tr of each subpixel SPix illustrated in FIG. 4 and wires such as the video signal line SL which supplies the pixel signal Vpix to each pixel electrode 22 and the scan signal line GL which drives each TFT element Tr are formed. The liquid crystal display device 20 illustrated in FIG. 4 includes a plurality of subpixels SPix arrayed in the matrix form. Each subpixel SPix includes the TFT element Tr, a liquid crystal element LC and a storage capacitor C. Each TFT element Tr is configured by a thin film transistor, and is configured by a metal oxide semiconductor (MOS) TFT of an n channel type in this example. A source of the TFT element Tr is connected to the video signal line SL, a gate of the same is connected to the scan signal line GL, and a drain of the same is connected to one end of the liquid crystal element LC. One end of the liquid crystal element LC is connected to the drain of the TFT element Tr, and the other end of the same is connected to the drive electrode Tx. Each liquid crystal element LC is a display function layer which exhibits an image display function based on the pixel signal Vpix. One end of the storage capacitor C is connected to the drain of the TFT element Tr, and the other end of the same is connected to the drive electrode Tx.

Each subpixel SPix is connected with the other subpixel SPix belonging to the same row of the liquid crystal display device 20 by the scan signal line GL. To each scan signal line GL, the gate driver 12 is connected, and the scan signal Vscan is supplied from the gate driver 12. Further, each subpixel SPix is connected with the other subpixels SPix belonging to the same column of the liquid crystal display device 20 by each video signal line SL. To each video signal line SL, the source driver 13 is connected, and the pixel signal Vpix is supplied from the source driver 13. To each drive electrode Tx, the drive electrode driver 15 is connected via the drive signal selector unit 16, and the drive signal Vcom is supplied from the drive electrode driver 15. That is, in this example, a plurality of subpixels SPix belonging to the same column share one drive electrode Tx.

The gate driver 12 illustrated in FIG. 1 applies the scan signal Vscan to the gate of each TFT element Tr of each subpixel SPix via each scan signal line GL illustrated in FIG. 4, so that one row (one horizontal line) of the subpixels SPix formed in the matrix form on the liquid crystal display device 20 is sequentially selected as a display drive target. The source driver 13 illustrated in FIG. 1 supplies the pixel signal Vpix to each of the subpixels SPix configuring one of the horizontal lines sequentially selected by the gate driver 12, via each video signal line SL illustrated in FIG. 4. Further, these subpixels SPix perform display on one horizontal line in accordance with the supplied pixel signals Vpix. The drive electrode driver 15 illustrated in FIG. 1 applies the drive signal Vcom to drive the drive electrodes Tx illustrated in FIGS. 3 and 4.

As described above, the liquid crystal display device 20 sequentially selects one of the horizontal lines by causing the gate driver 12 to sequentially scan the scan signal lines GL for each line in a time division mode. Further, the liquid crystal display device 20 performs the display on the horizontal lines one by one by causing the source driver 13 to supply the pixel signal Vpix to the subpixels SPix belonging to one horizontal line. In this display operation, the drive electrode driver 15 applies display drive signal Vcom to the drive electrodes Tx corresponding to this one horizontal line. Thus, each drive electrode Tx functions as a common electrode of the liquid crystal display device 20, and also functions as a drive electrode of the touch detection device 30. In the following description, the drive signal Vcom which is a display drive signal will also be described as the display drive signal Vcom, and the drive signal Vcom which is a touch drive signal will also be described as the touch drive signal Vcom.

In the color filter 32 illustrated in FIG. 3, color regions of the color filter colored by, for example, three colors of red (R), green (G) and blue (B) are periodically arranged, and a set of the three color regions 32R, 32G and 32B for R, G and B is corresponded to each subpixel SPix illustrated in FIG. 4 as a pixel Pix. Thus, each subpixel SPix can display a single color. The color filter 32 faces the liquid crystal layer 6 in the direction vertical to the TFT substrate 21. Note that the color filter 32 may have combination of other colors as long as the color filter 32 is colored by different colors. The color filter 32 may not be necessary. That is, the display apparatus may have a region without the color filter, i.e., a transparent subpixel.

Each drive electrode Tx according to the present embodiment functions as a drive electrode of the liquid crystal display device 20 and also functions as a drive electrode of the touch detection device 30. Each drive electrode Tx faces each pixel electrode 22 in the direction vertical to the surface of the TFT substrate 21. One drive electrode Tx is arranged so as to correspond to one pixel electrode 22 (the pixel electrode 22 configuring one column). Further, each drive electrode Tx extends in a direction parallel to a direction in which each video signal line SL extends.

<Basic Principle of Mutual Capacitance Detecting Method>

Figure 5A:
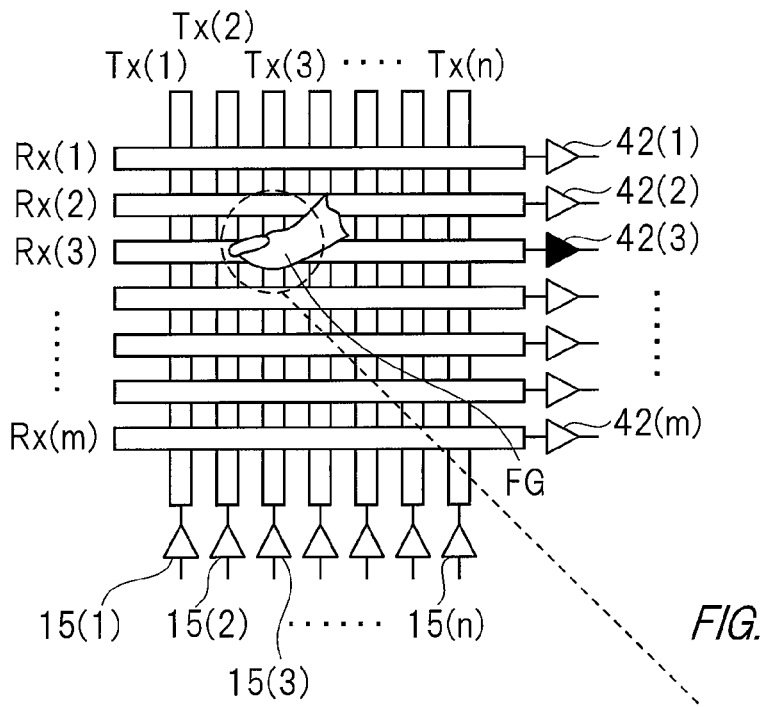
FIGS. 5A to 5C are explanatory diagrams for explaining a basic principle of a mutual capacitance detecting method used for the display apparatus with the touch detection function according to the embodiment.
Figure 5B:
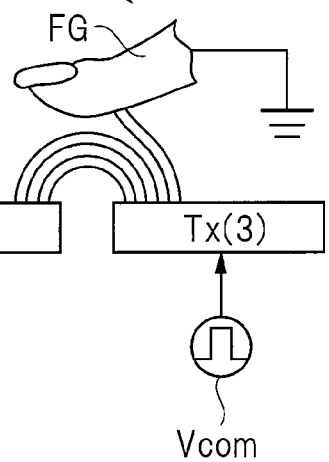
Figure 5C:
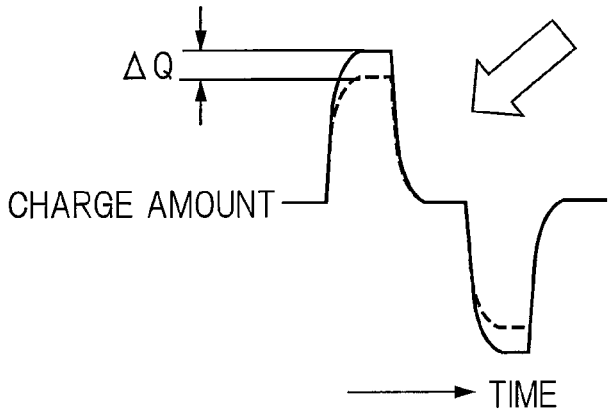

FIGS. 5A to 5C are explanatory diagrams for explaining the basic principle of the mutual capacitance detecting method used for the display apparatus with the touch detection function 1 according to the present embodiment. The mutual capacitance detecting method is a method using change in capacitances between drive electrodes and detection electrodes due to approach or contact of an object such as a user's finger to detect coordinates at which the object approaches or contacts.

In FIG. 5A, each of Tx(1) to Tx(n) represents a drive electrode provided to the liquid crystal display device 20, and each of Rx(1) to Rx(m) represents a detection electrode provided to the touch detection device 30.

In FIG. 5A, each of 15(1) to 15(n) represents a drive circuit provided in the drive electrode driver 15. That is, from the drive circuits 15(1) to 15(n), the touch drive signals Vcom of the drive electrodes Tx(1) to Tx(n) are output. Further, each of 42(1) to 42(m) represents an amplification circuit in the touch detection signal amplifying unit 42. In FIG. 5B, a pulse signal encircled by a circle of a solid line indicates a waveform of the touch drive signal Vcom. In this drawing, a finger is denoted with "FG" as an external object.

In the mutual capacitance detecting method, when the finger FG touches a position close to the drive electrode Tx(3) of the liquid crystal display device 20, an electric field is also produced between the finger FG and the drive electrode Tx(3), and an electric field produced between the drive electrode TX(3) and the detection electrode Rx(3) decreases. Thus, a charge amount between the drive electrode Tx(3) and the detection electrode Rx(3) decreases. As a result, as illustrated in FIG. 5C, when the finger FG is touching, the charge amount produced in response to the supply of the touch drive signal Vcom decreases by ΔQ from a state of no touch of the finger FG. A difference in the charge amount appears on the detection signal as a difference in a voltage, and the detection signal is supplied to and amplified by the amplification circuit 42(3) in the touch detection signal amplifying unit 42.

In the mutual capacitance detecting method, by supplying the touch drive signals Vcom to the sequentially-designated drive electrodes Tx(1) to Tx(n), each of a plurality of detection electrodes Rx(1) to Rx(m) intersecting the sequentially-designated drive electrodes Tx(1) to Tx(n) outputs a detection signal having a voltage value caused depending on whether or not the finger FG is touching a position close to each intersection. The A/D converting unit 43 (FIG. 1) samples each detection signal at a time at which the difference ΔQ is made in the charge amount, depending on whether or not the finger FG is touching, and converts each detection signal into a digital signal. Further, after the signal processing by the signal processing unit 44, the coordinate extracting unit 45 calculates the detailed touch position coordinates on the display apparatus with the touch detection function 10 and obtains a calculation result as touch detection information (signal output Vout). Thus, the touch position coordinates of the finger FG can be detected.

<Basic Principle of Self-Capacitance Detecting Method>

Figure 6A:
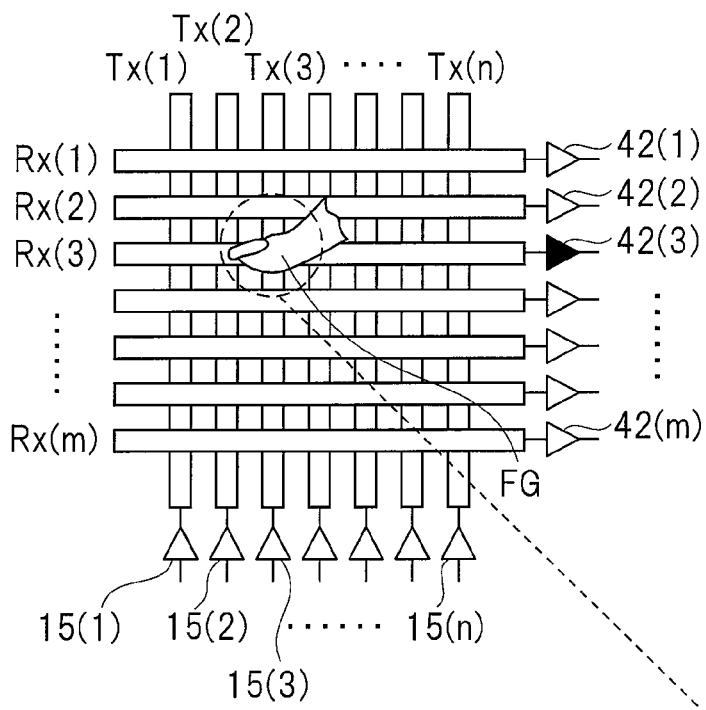
FIGS. 6A to 6C are explanatory diagrams for explaining a basic principle of a self-capacitance detecting method used for the display apparatus with the touch detection function according to the embodiment.
Figure 6B:
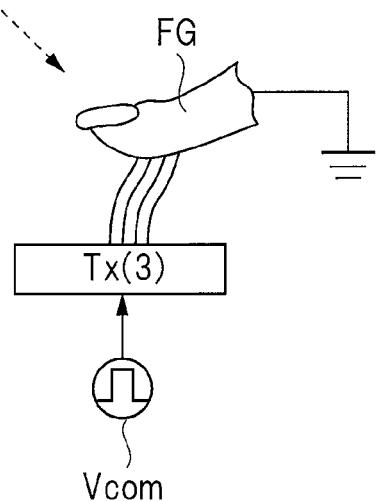
Figure 6C:
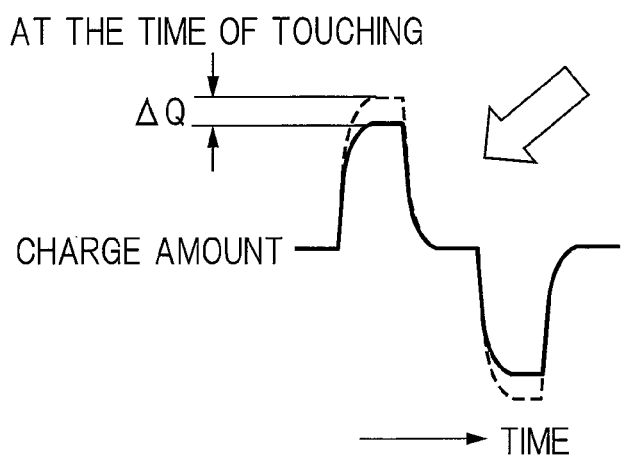

FIGS. 6A to 6C are explanatory diagrams for explaining the basic principle of the self-capacitance detecting method used for the display apparatus with the touch detection function 1 according to the present embodiment. The self-capacitance detecting method is a method for detecting the approach or the contact of the object by using change in a ground capacitance of the detection electrode due to the approach or the contact of the object such as a user's finger.

As similar to above-described FIG. 5A, in FIG. 6A, the drive electrodes Tx(1) to Tx(n) are arranged to extend in the longitudinal direction and to be next to one another in the lateral direction. Further, the detection electrode Rx(1) to Rx(m) are arranged to extend in the lateral direction so as to intersect the drive electrodes Tx(1) to Tx(n) and to be next to one another in the longitudinal direction.

Here, for convenience of description, Tx(1) to Tx(n) represent drive electrodes, and Rx (1) to Rx(m) represent detection electrodes. The touch drive signal Vcom is supplied to each of the drive electrodes Tx(1) to Tx(n) and the detection electrodes Rx(1) to Rx(m), and the detection signal is output from the drive electrodes Tx(1) to Tx(n) and the detection electrodes Rx(1) to Rx(m). Consequently, from a viewpoint of the touch detection of the external object, both of the drive electrodes Tx (1) to Tx (n) and the detection electrodes Rx(1) to Rx(m) can be regarded as the detection electrodes.

Note that the drive electrodes Tx and the detection electrodes Rx are used to detect an accurate position in the above description. However, when it is not necessary to specify the position or it is not necessary to accurately specify the position, only ones of them may be used for the self-capacitance detection.

In the self-capacitance detecting method, the detection principle which uses the drive electrodes Tx (1) to Tx (n) and the detection principle which uses the detection electrodes Rx(1) to Rx(m) are the same as each other. In the following description for FIGS. 6B and 6C, the drive electrodes Tx (1) to Tx (n) will be exemplified.

There is a parasitic capacitance between each of the drive electrodes Tx (1) to Tx (n) and a ground voltage. When, for example, the finger FG as the external object touches in the vicinity of the drive electrode Tx (3), an electric field is produced between the drive electrode Tx (3) and the finger FG as illustrated in FIG. 6B. In other words, by the approach of the finger FG, a capacitance connected between the drive electrode Tx (3) and the ground voltage is increased. Hence, when such a touch drive signal Vcom as changing a voltage in a pulsed pattern is supplied to the drive electrode Tx (3) as encircled by a circle in FIG. 6B, a charge amount accumulated between the drive electrode Tx(3) and the ground voltage is changed by whether or not the finger is touching in the vicinity of the drive electrode Tx(3).

FIG. 6C illustrates the change in the charge amount accumulated on the drive electrode Tx(3) by whether or not the finger FG is touching in the vicinity of the drive electrode Tx(3). When the finger FG is touching in the vicinity of the drive electrode Tx(3), the capacitance connected to the drive electrode Tx(3) increases. Therefore, when the pulse-pattern touch drive signal Vcom is supplied to the drive electrode Tx(3), the charge amount accumulated on the drive electrode Tx(3) increases by $\Delta Q$ from the state without the touch. In FIG. 6C, a horizontal axis indicates time, and a vertical axis indicates the charge amount. Further, in FIG. 6C, a broken line indicates the change in the charge amount caused in the touch.

In the self-capacitance detecting method, it can be detected whether the finger FG is touching or not by detecting the difference $\Delta Q$ in the charge amount accumulated on each of the drive electrodes Tx(1) to Tx(n) when the touch drive signal Vcom is supplied to all drive electrodes Tx(1) to Tx(n).

<Layout of Self-Capacitance Detection Wires>

Figure 7:
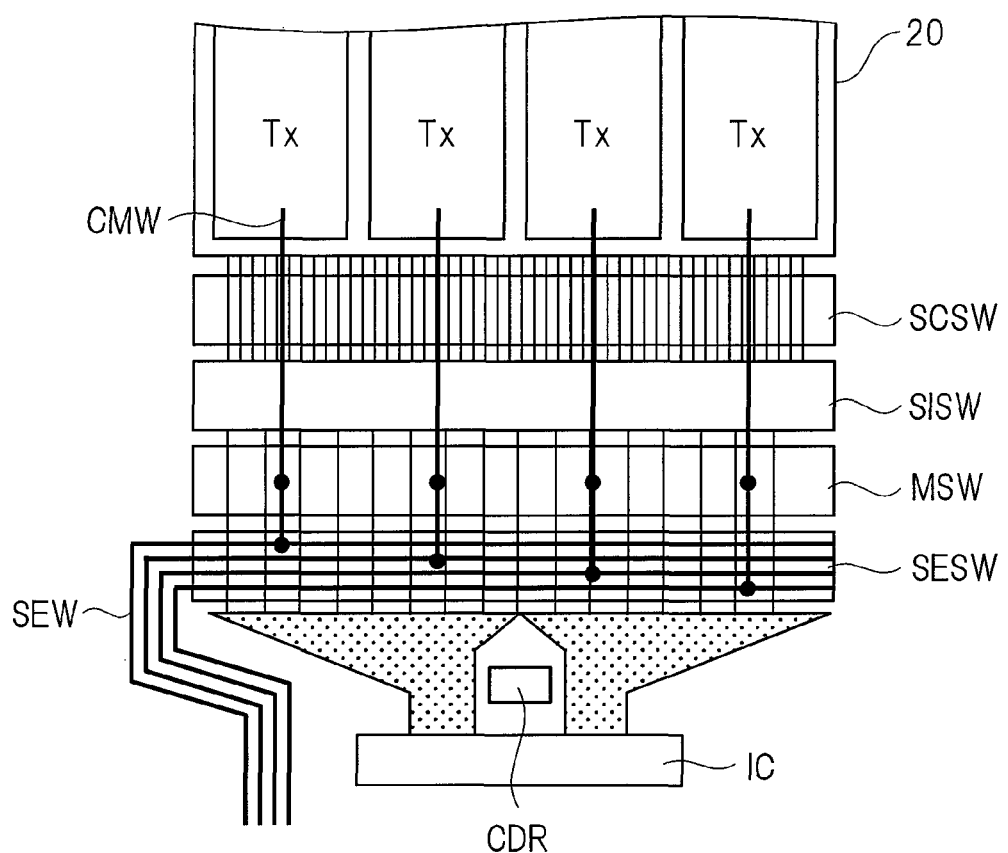
FIG. 7 is an explanatory diagram illustrating an example of a layout of self-capacitance detection wires according to a comparative example of the embodiment.
Figure 8:
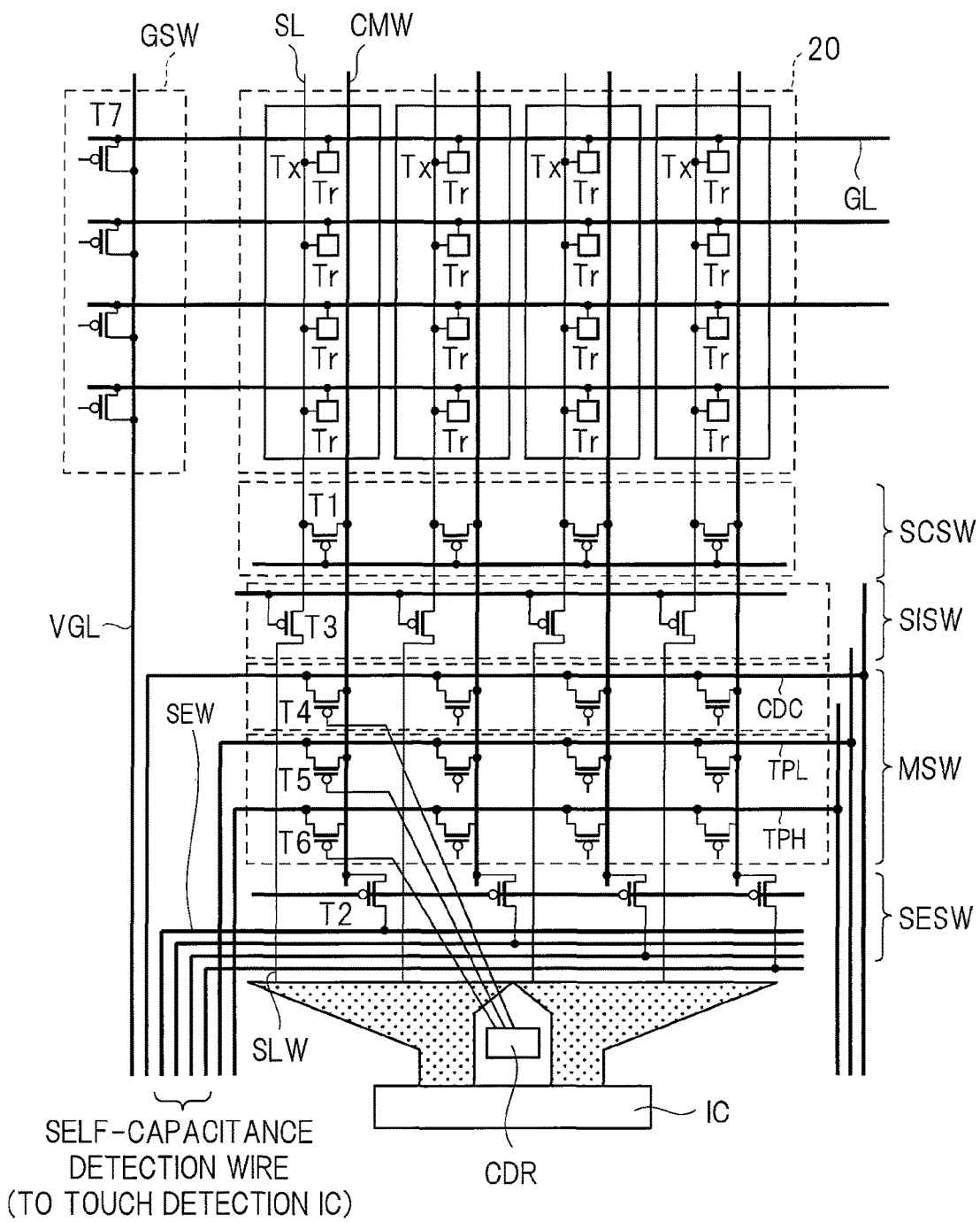
FIG. 8 is a circuit diagram illustrating an example of a main configuration including the self-capacitance detection wires according to the comparative example of the embodiment.

The following is explanation about a layout of self-capacitance detection wires which is a feature of the display apparatus with the touch detection function 1 according to the present embodiment. Here, in order to easily understand the feature of the display apparatus with the touch detection function 1 according to the present embodiment, the feature will be explained in comparison of a display apparatus with a touch detection function according to a comparative example with that of the present embodiment. FIG. 7 is an explanatory diagram illustrating an example of the layout of the self-capacitance detection wires in the comparative example in comparison with the present embodiment. FIG. 8 is a circuit diagram illustrating an example of a configuration of a principle part including the self-capacitance detection wires in the comparative example in comparison with the present embodiment.

For example, when a plurality of drive electrodes Tx are arranged to extend in a longitudinal direction of a panel and to be next to one another in a lateral direction of the same as shown in FIGS. 7 and 8 illustrating the comparative example in comparison with the present embodiment, the signal-line/common-wire short-circuiting switch circuit SCSW, the video signal line selection circuit SISW, the mutual capacitance detection switch circuit MSW, the self-capacitance detection switch circuit SESW, the drive electrode drive circuit CDR and the driver chip IC are arranged in this order below the liquid crystal display device 20.

In such a layout, the self-capacitance detection wires SEW of the self-capacitance detection switch circuit SESW are formed to extend in the lateral direction while the connection wires SLW which supply signals to the video signal lines SL are formed to extend in the longitudinal direction. Hence, in a portion closer to the driver chip IC than the video signal line selection circuit SISW, the self-capacitance detection wires SEW and the connection wires SLW which supply signals to the video signal lines SL intersect each other. A parasitic capacitance at this intersection portion becomes a load during driving of the drive electrode Tx based on the self-capacitance detecting method. That is, during a detection period based on the self-capacitance detecting method, the connection wires SLW which supply signals to the video signal lines SL are fixed at a certain potential such as a ground potential, and therefore, the intersection capacitances with the self-capacitance detection wires SEW are apparent from the drive electrodes Tx. The self-capacitance detecting method needs to have a countermeasure against a larger influence of the parasitic capacitance on the detection than that of the mutual capacitance detecting method.

Hence, in the display apparatus with the touch detection function according to the present embodiment, problems of the display apparatus with the touch detection function according to the comparative example are solved, and the parasitic capacitance during driving of the drive electrode based on the self-capacitance detecting method is reduced. The following is explanation about the layout of the self-capacitance detection wires in the display apparatus with the touch detection function according to the present embodiment.

<Layout of Self-Capacitance Detection Wires According to Present Embodiment>

Figure 9:
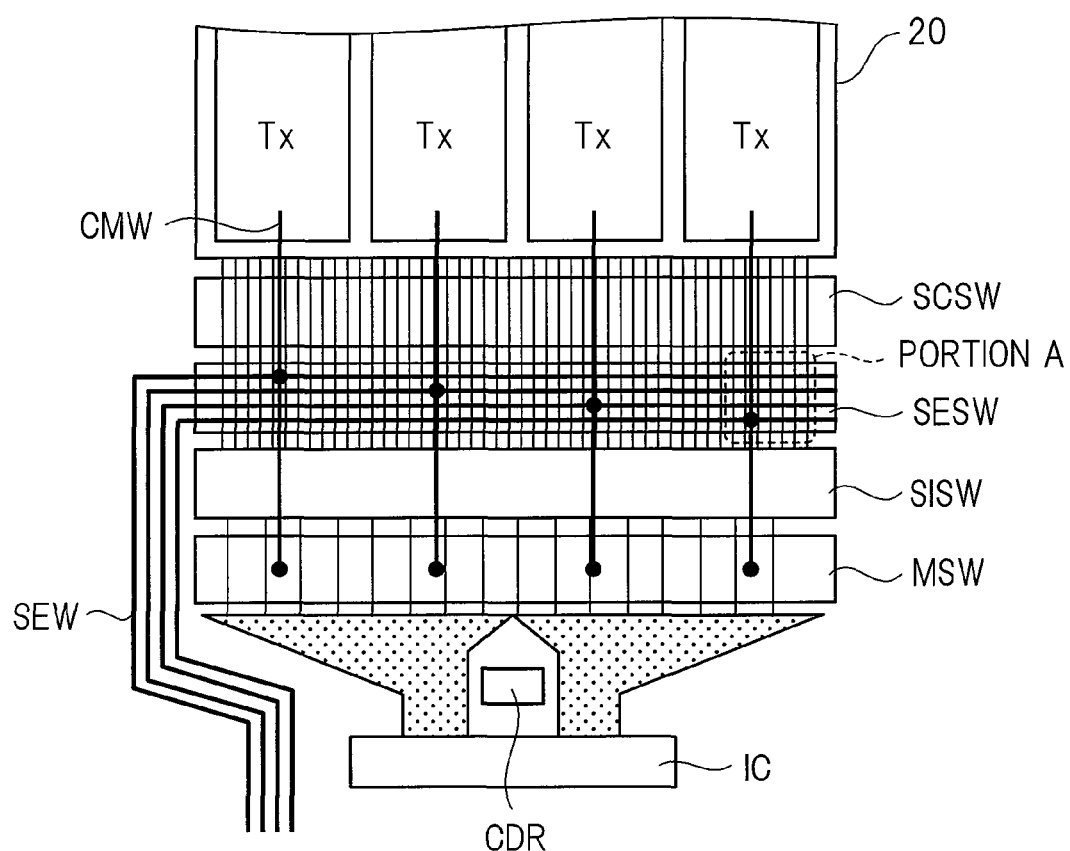
FIG. 9 is an explanatory diagram illustrating an example of a layout of self-capacitance detection wires in the display apparatus with the touch detection function according to the embodiment.
Figure 10:
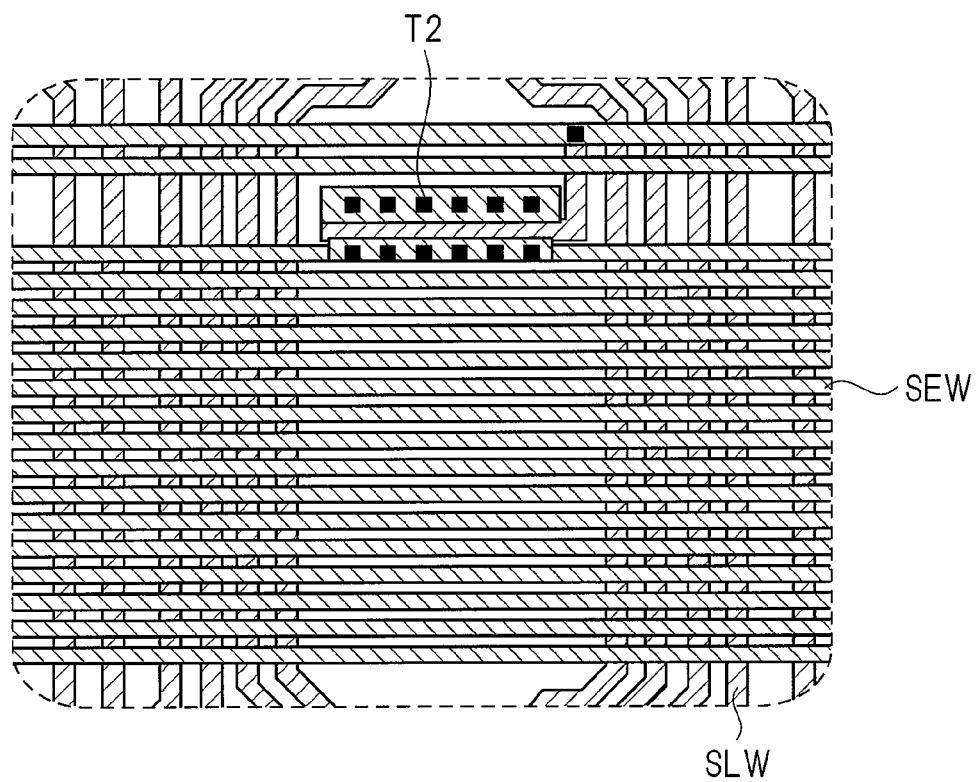
FIG. 10 is an explanatory diagram illustrating a portion of the self-capacitance detection wires in FIG. 9 so as to be enlarged.

FIG. 9 is an explanatory diagram illustrating an example of a layout of the self-capacitance detection wires in the display apparatus with the touch detection function according to the present embodiment. FIG. 10 is an explanatory diagram illustrating a part of the self-capacitance detection wires in FIG. 9 so as to be enlarged. FIG. 11 is a circuit diagram illustrating an example of a configuration of a principal part including the self-capacitance detection wires according to the present embodiment.

As illustrated in FIGS. 9 to 11 (see FIGS. 1 to 6 as well), the display apparatus with the touch detection function according to the present embodiment includes the pixel electrodes 22 which are the first electrodes, the drive electrodes Tx which are the second electrodes facing the pixel electrodes 22, the video signal lines SL which are a plurality of signal lines, and a plurality of scan signal lines GL. Each intersection portion between each video signal line SL and each scan signal line GL includes a TFT element Tr for each of pixels arrayed in the matrix form. The pixel electrodes 22, the drive electrodes Tx, the video signal lines SL, the scan signal lines GL and the TFT elements Tr are formed in a display area of the liquid crystal display device 20.

Further, the display apparatus with the touch detection function according to the present embodiment includes the signal-line/common-wire short-circuiting switch circuit SCSW, the self-capacitance detection switch circuit SESW, the video signal line selection circuit SISW, the mutual capacitance detection switch circuit MSW, the drive electrode drive circuit CDR, the driver chip IC and a scan signal line switch circuit GSW. These circuits are formed in a lower area of the peripheral area of the liquid crystal display device 20. The driver chip IC is mounted on the pixel substrate 2 in the lower area of the peripheral area. The scan signal line switch circuit GSW is formed in a left area of the peripheral area of the liquid crystal display device 20.

In FIG. 11, the signal-line/common-wire short-circuiting switch circuit SCSW includes transistors T1 which are switching elements. Each transistor T1 is connected between each video signal line SL and each common wire CMW. This signal-line/common-wire short-circuiting switch circuit SCSW is a circuit which causes short-circuit between each video signal line SL and each common wire CMW connected to each drive electrode Tx by the turning on of each transistor T1 so that each common wire CMW and each connection wire SLW have the same potentials as each other. Each transistor T1 is turned on and off by the drive electrode drive circuit CDR. The number of the transistors T1 is provided so as to correspond to the number of video signal lines SL. The signal-line/common-wire short-circuiting switch circuit SCSW is included in the drive signal selector unit 16 illustrated in FIG. 1.

The self-capacitance detection switch circuit SESW includes transistors T2 which are switching elements, and each transistor T2 is connected between each common wire CMW connected to each drive electrode Tx, and each self-capacitance detection wire SEW. The self-capacitance detection switch circuit SESW is a circuit which supplies a drive signal to each common wire CMW connected to each drive electrode Tx during detection based on the self-capacitance detecting method by the turning on of each transistor T2. Each transistor T2 is turned on and off by the drive electrode drive circuit CDR. The number of transistors T2 is provided so as to correspond to the number of common wires CMW connected to the drive electrodes Tx. Each transistor T2 of the self-capacitance detection switch circuit SESW is a switching element provided between each self-capacitance detection wire SEW and each common wire CMW. The self-capacitance detection switch circuit SESW is included in the drive signal selector unit 16 illustrated in FIG. 1.

The video signal line selection circuit SISW includes transistors T3 which are switching elements, and each transistor T3 is connected between each video signal line SL and each connection wire SLW connected to the driver chip IC. This video signal line selection circuit SISW is a circuit which connects each video signal line SL and each connection wire SLW connected to the driver chip IC by the turning on of each transistor T3. Each transistor T3 is turned on and off by the driver chip IC. The number of transistors T3 is provided so as to correspond to the number of video signal lines SL. The video signal line selection circuit SISW is a selection circuit which is connected with a plurality of connection wires SLW, which selects at least one connection wire SLW of a plurality of connection wires SLW, and which supplies a signal to the video signal line SL via the connection wire SLW. The video signal line selection circuit SISW is included in the source selector unit 14 illustrated in FIG. 1.

The mutual capacitance detection switch circuit MSW includes transistors T4, T5 and T6 which are switching elements, and each of the transistors T4, T5 and T6 is connected between each common wire CMW connected to each drive electrode Tx and each mutual capacitance detection wire (the voltage CDC, the voltage TPL and the voltage TPH). This mutual capacitance detection switch circuit MSW is a circuit which supplies a drive signal (the voltage CDC, the voltage TPL and the voltage TPH) to each common wire CMW connected to each drive electrode Tx during detection based on the mutual capacitance detecting method by the turning on of each of the transistors T4, T5 and T6. Each of the transistors T4, T5 and T6 is turned on and off by the drive electrode drive circuit CDR. The number of each of the transistors T4, T5 and T6 is provided so as to correspond to the number of common wires CMW connected to the drive electrodes Tx. The mutual capacitance detection switch circuit MSW is included in the drive signal selector unit 16 illustrated in FIG. 1.

The drive electrode drive circuit CDR is a circuit which drives the transistors T4, T5 and T6 of the mutual capacitance detection switch circuit MSW, the transistors T1 of the signal-line/common-wire short-circuiting switch circuit SCSW and the transistors T2 of the self-capacitance detection switch circuit SESW. The drive electrode drive circuit CDR is included in the drive electrode driver 15 illustrated in FIG. 1.

The driver chip IC is an integrated circuit chip which supplies video signals to the video signal lines SL. The driver chip IC includes the control unit 11 illustrated in FIG. 1 or others.

The scan signal line switch circuit GSW includes transistors T7 which are switching elements, and each transistor T7 is connected between each scan signal line GL and each self-capacitance detection wire (voltage VGL). This scan signal line switch circuit GSW is a circuit which supplies a drive signal (voltage VGL) to each scan signal line GL during detection based on the self-capacitance detecting method by the turning on of each transistor T7. Each transistor T7 is turned on and off by the drive circuit in the gate driver 12. The number of transistors T7 is provided so as to correspond to the number of scan signal lines GL. The scan signal line switch circuit GSW is included in the gate driver 12 illustrated in FIG. 1.

As illustrated in FIG. 10 (a portion A illustrated in FIG. 9), each self-capacitance detection wire SEW is a first wire which extends in a direction (lateral direction) intersecting an extending direction (longitudinal direction) of the connection wires SLW and which intersects each connection wire SLW. In FIG. 11, a plurality of mutual capacitance detection wires (the voltage CDC, the voltage TPL and the voltage TPH) of the mutual capacitance detection switch circuit MSW are formed to extend in the lateral direction of the panel and to be next to one another in the longitudinal direction of the same.

In the configuration as illustrated in FIGS. 9 to 11, each self-capacitance detection wire SEW of the self-capacitance detection switch circuit SESW extends between the display area of the liquid crystal display device 20 and the video signal line selection circuit SISW in a plan view.

Further, the display apparatus with the touch detection function according to the present embodiment includes the touch detecting unit 40 (see FIG. 1) which is a detection circuit connected to the self-capacitance detection wires SEW which are the first wires. The touch detecting unit 40 is an integrated circuit chip which is a touch detection IC. Further, each drive electrode Tx which is the second electrode also has a function of a detection electrode which detects the approach or the contact of the object. The touch detecting unit 40 which is the detection circuit detects the approach or the contact of the object based on the self-capacitance detecting method. Further, as described above, signal lines are the video signal lines SL, and a selection circuit is the video signal line selection circuit SISW.

During the detection based on the self-capacitance detecting method in the display apparatus with the touch detection function according to the present embodiment, the connection wires SLW intersecting the self-capacitance detection wires SEW are floated in terms of a potential or have the same potential as that of the common wire CMW.

More specifically, by the turning off of each transistor T3 which is the switching element of the video signal line selection circuit SISW, each connection wire SLW closer to the display area than the video signal line selection circuit SISW is floated in terms of a potential. Further, by using the signal-line/common-wire short-circuiting switch circuit SCSW, the same potential as a potential supplied to each self-capacitance detection wire SEW may be supplied to each connection wire SLW. That is, by the turning on of each transistor T1 which is the switching element of the signal-line/common-wire short-circuiting switch circuit SCSW, the same potential as the potential supplied to each self-capacitance detection wire SEW is supplied to each connection wire SLW closer to the display area than the signal-line/common-wire short-circuiting switch circuit SCSW.

At this time, from the video signal line selection circuit SISW, a ground potential is supplied to each wire closer to the driver chip IC which is the drive circuit connected with the connection wires SLW. That is, the ground potential is supplied to each wire closer to the driver chip IC than the video signal line selection circuit SISW, and the wire is fixed at the ground potential. Consequently, the potentials of the connection wires SLW closer to the driver chip IC than the video signal line selection circuit SISW do not fluctuate, and therefore, erroneous detection can be prevented.

In the above-described display apparatus with the touch detection function according to the present embodiment, the self-capacitance detection wires SEW intersect the connection wires SLW closer to the display area than the video signal line selection circuit SISW. In this case, by causing the connection wires SLW closer to the display area than the video signal line selection circuit SISW to be floated in terms of a potential, the intersection capacitances with the common wires CMW can be reduced. Also when the potentials of the connection wires SLW and the common wires CMW are set to the same potential as each other, the intersection capacitances can be reduced.

Thus, during detection based on the self-capacitance detecting method in the present embodiment, the video signal lines SL are amplified in the same phase as those of the drive electrodes Tx although the connection wires SLW are fixed at direct-current potentials, and therefore, the intersection capacitances are not substantially apparent, so that the load during driving of the drive electrodes Tx can be reduced.

Also when there is no signal-line/common-wire short-circuiting switch circuit SCSW connecting the video signal lines SL and the common wires CMW connected to the drive electrodes Tx, note that the intersection capacitances can be substantially inapparent. For example, even when there is no signal-line/common-wire short-circuiting switch circuit SCSW and even when the connection wires SLW connected to the video signal lines SL are floated in terms of a potential, the video signal lines SL are amplified in the same phase as those of the common wires CMW, and therefore, the capacitances between the common wires CMW and the video signal lines SL are not substantially apparent.

Further, in the display apparatus with the touch detection function according to the present embodiment, the capacitances between the scan signal lines GL and the common wires CMW are also considered. During detection based on the self-capacitance detecting method, the scan signal lines GL are also floated in terms of a potential. That is, the scan signal lines GL are floated in terms of a potential by turning off the transistors T7 which are the switching elements of the scan signal line switch circuit GSW connected to the scan signal lines GL. Alternatively, the transistors T7 which are the switching elements of the scan signal line switch circuit GSW connected to the scan signal lines GL are turned on so that a potential (voltage VGL) with the same phase as that of the potential supplied to the self-capacitance detection wires SEW is supplied to the scan signal lines GL. Consequently, the capacitances between the common wires CMW and the scan signal line GL are substantially inapparent, so that the load during driving of the drive electrodes Tx can be reduced.

First Modified Example

The following is explanation about a modified example of the display apparatus with the touch detection function according to the present embodiment. Differences from the above-described embodiment will be mainly described.

FIG. 12 is a circuit diagram illustrating an example of a configuration of a principal part including self-capacitance detection wires according to a first modified example in the display apparatus with the touch detection function according to the present embodiment.

In the above-described embodiment, such arrangement of the plurality of drive electrodes Tx as extending in the longitudinal direction of the panel and as being next to one another in the lateral direction of the same has been exemplified. On the other hand, as illustrated in FIG. 12, the first modified example is an example of such arrangement of the plurality of drive electrodes Tx as extending in the lateral direction of the panel and being next to one another in the longitudinal direction of the same. That is, the plurality drive electrodes Tx are formed to extend in the lateral direction of the panel (pixel substrate 2) and to be next to one another in the longitudinal direction of the same.

Further, in the first modified example, the plurality of common wires CMW connected to the plurality of drive electrodes Tx are formed to extend in the lateral direction of the panel and to be next to one another in the longitudinal direction of the same. As similar to the above-described embodiment, the plurality of scan signal lines GL are formed to extend in the lateral direction of the panel and to be next to one another in the longitudinal direction of the same. As similar to the above-described embodiment, the plurality of video signal lines SL are formed to extend in the longitudinal direction of the panel and to be next to one another in the lateral direction of the same. As similar to the above-described embodiment, the plurality of connection wires SLW connected with the plurality of video signal lines SL are formed to extend in the longitudinal direction of the panel and to be next to one another in the lateral direction of the same.

In the first modified example, a video signal line selection circuit SISW and a drive electrode drive circuit CDR are formed in a lower area of a peripheral area of a liquid crystal display device 20. A driver chip IC is mounted on the pixel substrate 2 in the lower area of the peripheral area. A self-capacitance detection switch circuit SESW, a scan signal line switch circuit GSW and a mutual capacitance detection switch circuit MSW are formed in a left area and a right area of the peripheral area of the liquid crystal display device 20.

The video signal line selection circuit SISW includes transistors T13 which are the same as those in the above-described embodiment, and each transistor T13 is connected between each video signal line SL and each connection wire SLW connected to the driver chip IC and is driven as similar to the above-described embodiment. As similar to the above-described embodiment, the drive electrode drive circuit CDR is a circuit which drives transistors 114 and T15 of the mutual capacitance detection switch circuit MSW, the transistors T12 of the self-capacitance detection switch circuit SESW, and others. As similar to the above-described embodiment, the driver chip IC is an integrated circuit chip which supplies video signals to the video signal lines SL.

The self-capacitance detection switch circuit SESW includes the transistors T12 which are the same as those of the above-described embodiment, and each transistor T12 is connected between each common wire CMW connected to each drive electrode Tx and each self-capacitance detection wire SEW and is driven as similar to the above-described embodiment. The scan signal line switch circuit GSW includes transistors T17 which are the same as those of the above-described embodiment, and each transistor T17 is connected between each scan signal line GL and a self-capacitance detection wire (voltage VGL) and is driven as similar to the above-described embodiment. The mutual capacitance detection switch circuit MSW includes the transistors T14 and T15 which are the same as those of the above-described embodiment, and each of the transistors T14 and T15 is connected between each common wire CMW connected to each drive electrode Tx, and each mutual capacitance detection wire (a voltage CDC and a voltage TSVcom) and is driven as similar to the above-described embodiment. The voltage TSVcom corresponds to an alternate-current drive signal amplified between the voltage TPL and the voltage TPH illustrated in FIG. 11.

In the first modified example, a plurality of self-capacitance detection wires SEW of the self-capacitance detection switch circuit SESW is formed in the lower area of the peripheral area to extend in the lateral direction of the panel. Further, also in the first modified example, a plurality of self-capacitance detection wires SEW extend between the display area of the liquid crystal display device 20 and the video signal line selection circuit SISW.

Also in the above-described first modified example, the self-capacitance detection wires SEW intersect the connection wires SLW closer to the display area than the video signal line selection circuit SISW. Consequently, as similar to the above-described embodiment, during detection based on the self-capacitance detecting method, the video signal lines SL are amplified in the same phase as those of the drive electrodes Tx while the connection wires SLW are fixed at the direct-current potential, and therefore, the intersection capacitances are not substantially apparent, so that the load during driving of the drive electrodes Tx can be reduced. Also for the capacitances between the scan signal lines GL and the common wires CMW, the capacitances between the common wires CMW and the scan signal lines GL are set to be substantially inapparent as similar to the above-described embodiment, so that the load during driving of the driving electrodes Tx can be reduced.

Second Modified Example

FIG. 13 is a circuit diagram illustrating an example of a configuration of a principal part including self-capacitance detection wires according to a second modified example of the display apparatus with the touch detection function according to the present embodiment.

In the above-described embodiment, such arrangement of the plurality of drive electrodes Tx as extending in the longitudinal direction of the panel and as being next to one another in the lateral direction of the same has been exemplified. Further, in the above-described first modified example, such arrangement of the plurality of drive electrodes Tx as extending in the lateral direction of the panel and as being next to one another in the longitudinal direction of the same has been exemplified. On the other hand, the second modified example is an example of such arrangement of the plurality of drive electrodes Tx as a matrix form as illustrated in FIG. 13. That is, the plurality of drive electrodes Tx are formed in the matrix form on the panel (pixel substrate 2). Here, the drive electrodes Tx having arrangement of 4 drive electrodes (in the longitudinal direction)×4 drive electrodes (in the lateral direction) are exemplified.

Further, as similar to the above-described embodiment, in the second modified example, a plurality of common wires CMW connected to the plurality of drive electrodes Tx are formed to extend in the longitudinal direction of the panel and to be next to one another in the lateral direction of the same. However, as different from the above-described embodiment, the four common wires CMW are formed so as to correspond to the four drive electrodes Tx in the longitudinal direction, a circuit corresponding to only one of the four is illustrated, and circuits corresponding to the other three are not illustrated here. As similar to the above-described embodiment, a plurality of scan signal lines GL are formed to extend in the lateral direction of the panel and to be next to one another in the longitudinal direction of the same. As similar to the above-described embodiment, a plurality of video signal lines SL are formed to extend in the longitudinal direction of the panel and to be next to one another in the lateral direction of the same. As similar to the above-described embodiment, a plurality of connection wires SLW connected to the plurality of video signal lines SL are formed to extend in the longitudinal direction of the panel and to be next to one another in the lateral direction of the same.

As similar to the above-described embodiment, in the second modified example, a signal-line/common-wire short-circuiting switch circuit SCSW, a self-capacitance detection switch circuit SESW, a video signal line selection circuit SISW, a mutual capacitance detection switch circuit MSW, and a drive electrode drive circuit CDR are formed in a lower area of a peripheral area of a liquid crystal display device 20. As similar to the above-described embodiment, a driver chip IC is mounted on the pixel substrate 2 in the lower area of the peripheral area. As similar to the above-described embodiment, a scan signal line switch circuit GSW is formed in a left area of the peripheral area of the liquid crystal display device 20.

These signal-line/common-wire short-circuiting switch circuit SCSW, self-capacitance detection switch circuit SESW, video signal line selection circuit SISW, mutual capacitance detection switch circuit MSW, drive electrode drive circuit CDR, driver chip IC and scan signal line switch circuit GSW are driven as similar to the above-described embodiment. However, as different from the above-described embodiment, the number of each transistor of the signal-line/common-wire short-circuiting switch circuit SCSW, the self-capacitance detection switch circuit SESW and the mutual capacitance detection switch circuit MSW is provided so as to correspond to the number of drive electrodes Tx arranged in the matrix form.

In the second modified example, a plurality of self-capacitance detection wires SEW of the self-capacitance detection switch circuit SESW are formed in the lower area of the peripheral area to extend in the lateral direction of the panel. Further, also in the second modified example, a plurality of self-capacitance detection wires SEW extend between the display area of the liquid crystal display device 20 and the video signal line selection circuit SISW.

Also in the above-described second modified example, the self-capacitance detection wires SEW intersect the connection wires SLW closer to the display area than the video signal line selection circuit SISW. Consequently, as similar to the above-described embodiment, during detection based on the self-capacitance detecting method, the video signal lines SL are amplified in the same phase as those of the drive electrodes Tx while the connection wires SLW are fixed at a direct-current potential, and therefore, the intersection capacitances are not substantially apparent, so that the load during driving of the drive electrodes Tx can be reduced. Further, as similar to the above-described embodiment, also for the capacitances between the scan signal lines GL an the common wires CMW, the capacitances between the common wires CMW and the scan signal lines GL are set to be substantially inapparent, so that the load during driving of the drive electrodes Tx can be reduced.

In the foregoing, the invention made by the present inventors has been concretely described based on the embodiments. However, it is needless to say that the present invention is not limited to the foregoing embodiments and various modifications and alterations can be made within the scope of the present invention.

In the above-described embodiments, the case of the liquid crystal display apparatus has been exemplified as the disclosure example. However, as another application example, various types of flat-panel display apparatuses such as an organic EL display apparatus, other self-luminous type display apparatus, and an electronic-paper type display apparatus having an electrophoretic element can be exemplified.

In the scope of the concept of the present invention, various modified examples and alteration examples could have been easily thought up by those who skilled in the art, and it would be understood that these various modified examples and alteration examples belong to the scope of the present invention. For example, the ones obtained by appropriate addition, removal, or design-change of the components to/from/into each of the above-described embodiments by those who skilled in the art or obtained by addition, omitting, or condition-change of the step to/from/into each of the above-described embodiments are also within the scope of the present invention as long as they include the concept of the present invention.

Further, regarding the other functions and effects which are accompanied by aspects described in the present embodiment, it would be understood that the present invention naturally provides the functions and effects which are obvious from the description of the present specification or which can be appropriately conceived by those who skilled in the art.

What is claimed is:

1. An electronic device comprising:
   a first electrode, a second electrode facing the first electrode, and a plurality of signal lines, which are in a display area;
   a plurality of connection wires which are in a peripheral area and which are connected to the plurality of corresponding signal lines;
   a selection circuit which is connected with the plurality of connection wires, which selects at least one connection wire of the plurality of connection wires and which supplies a signal to one signal line of the plurality of signal lines via the connection wire;
   a first wire which extends in a direction intersecting an extension direction of the connection wires and which intersects the connection wires;
   a second wire which electrically connects the first wire and the second electrode;
   a switching element which is between the first wire and the second wire; and
   a detection circuit which is connected to the first wire and which supplies a drive signal to the second electrode via the switching element and the second wire,
   wherein
   the selection circuit is between the display area and the connection wires in a plan view,
   the switching element is between the display area and the selection circuit in a plan view, and
   the first wire extends between the selection circuit and the switching element in a plan view.

2. The electronic device according to claim 1,
   wherein the second electrode also has a function of a detection electrode which detects approach or contact of an object, and
   the detection circuit detects the approach or the contact of the object based on a self-capacitance detecting method.

3. The electronic device according to claim 1,
   wherein the signal lines are video signal lines, and
   the selection circuit is a video signal line selection circuit.

4. The electronic device according to claim 1,
   wherein the connection wires are floated in terms of a potential during detection.

5. The electronic device according to claim 1, further comprising
   a switch circuit which is connected to the connection wires and which supplies the same potential as a potential supplied to the first wire, to the connection wires.

6. The electronic device according to claim 4,
   wherein a ground potential is supplied to the connection wire which is between a drive circuit and the selection circuit.

7. The electronic device according to claim 4, further comprising
   a scan signal line,
   wherein the scan signal line is floated in terms of a potential.

8. The electronic device according to claim 4, further comprising:
   a scan signal line; and
   a switch circuit which supplies the same potential as a potential supplied to the first wire, to the scan signal line.

9. The electronic device according to claim 2,
   wherein the signal lines are video signal lines, and
   the selection circuit is a video signal line selection circuit.

10. The electronic device according to claim 2,
    wherein the connection wires are floated in terms of a potential during detection.

11. The electronic device according to claim 3,
    wherein the connection wires are floated in terms of a potential during detection.

12. The electronic device according to claim 2, further comprising
    a switch circuit which is connected to the connection wires and which supplies the same potential as a potential supplied to the first wire, to the connection wires.

13. The electronic device according to claim 3, further comprising
- a switch circuit which is connected to the connection wires and which supplies the same potential as a potential supplied to the first wire, to the connection wires.

14. The electronic device according to claim 5,
- wherein a ground potential is supplied to the connection wire which is between a drive circuit and the selection circuit.

15. The electronic device according to claim 5, further comprising
- a scan signal line,
- wherein the scan signal line is floated in terms of a potential.

16. The electronic device according to claim 6, further comprising
- a scan signal line,
- wherein the scan signal line is floated in terms of a potential during detection.

17. The electronic device according to claim 5, further comprising:
- a scan signal line; and
- a switch circuit which supplies the same potential as a potential supplied to the first wire, to the scan signal line during detection.

18. The electronic device according to claim 6, further comprising:
- a scan signal line; and
- a switch circuit which supplies the same potential as a potential supplied to the first wire, to the scan signal line during detection.

\* \* \* \* \*